United States Patent
Islam et al.

(10) Patent No.: US 11,470,604 B2
(45) Date of Patent: Oct. 11, 2022

(54) REPORTING AND SCHEDULING IN AN INTEGRATED ACCESS BACKHAUL NETWORK

(71) Applicant: QUALCOMM Incorporated, San Diego, CA (US)

(72) Inventors: Muhammad Nazmul Islam, Littleton, MA (US); Navid Abedini, Somerset, NJ (US); Sundar Subramanian, San Diego, CA (US); Junyi Li, Chester, NJ (US); Karl Georg Hampel, Hoboken, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 16/548,462

(22) Filed: Aug. 22, 2019

(65) Prior Publication Data
US 2020/0068567 A1 Feb. 27, 2020

Related U.S. Application Data

(60) Provisional application No. 62/722,332, filed on Aug. 24, 2018.

(51) Int. Cl.
| | | |
|---|---|---|
| H04W 72/04 | (2009.01) | |
| H04W 72/08 | (2009.01) | |
| H04W 72/12 | (2009.01) | |
| H04L 5/00 | (2006.01) | |

(52) U.S. Cl.
CPC ....... *H04W 72/0446* (2013.01); *H04L 5/0055* (2013.01); *H04W 72/085* (2013.01); *H04W 72/12* (2013.01)

(58) Field of Classification Search
CPC .......... H04W 72/0446; H04W 72/085; H04W 72/12; H04L 5/0055
USPC ....................................................... 370/336
See application file for complete search history.

(56) References Cited

U.S. PATENT DOCUMENTS

| | | | |
|---|---|---|---|
| 8,417,255 B2 * | 4/2013 | Dayal | H04W 72/04 455/452.2 |
| 2013/0114531 A1 | 5/2013 | Ahn et al. | |
| 2014/0241262 A1 * | 8/2014 | Novak | H04W 72/042 370/329 |

(Continued)

FOREIGN PATENT DOCUMENTS

AU 2018216827 A1 * 9/2019 ............... H04B 7/04

OTHER PUBLICATIONS

U.S. Appl. No. 62/631,627, filed Feb. 16, 2018.*
International Search Report and Written Opinion—PCT/US2019/047859—ISA/EPO—dated Nov. 4, 2019.

*Primary Examiner* — Faisal Choudhury
(74) *Attorney, Agent, or Firm* — QUALCOMM Incorporated

(57) ABSTRACT

Wireless communications systems and methods related to communicating in an integrated access backhaul (IAB) network are provided. A first wireless communication device transmits to a second wireless device during a first one of a plurality of slots; and receives a second transmission from the second wireless device during a second one of the plurality of slots. The second transmission includes link quality information about the first transmission and scheduling information for a third transmission between the first and second wireless devices.

19 Claims, 9 Drawing Sheets

(56) References Cited

U.S. PATENT DOCUMENTS

| | | |
|---|---|---|
| 2016/0029403 A1 | 1/2016 | Roy et al. |
| 2019/0261244 A1* | 8/2019 | Jung .................. H04W 36/06 |
| 2020/0228257 A1* | 7/2020 | Baldemair ............ H04L 5/0092 |

* cited by examiner

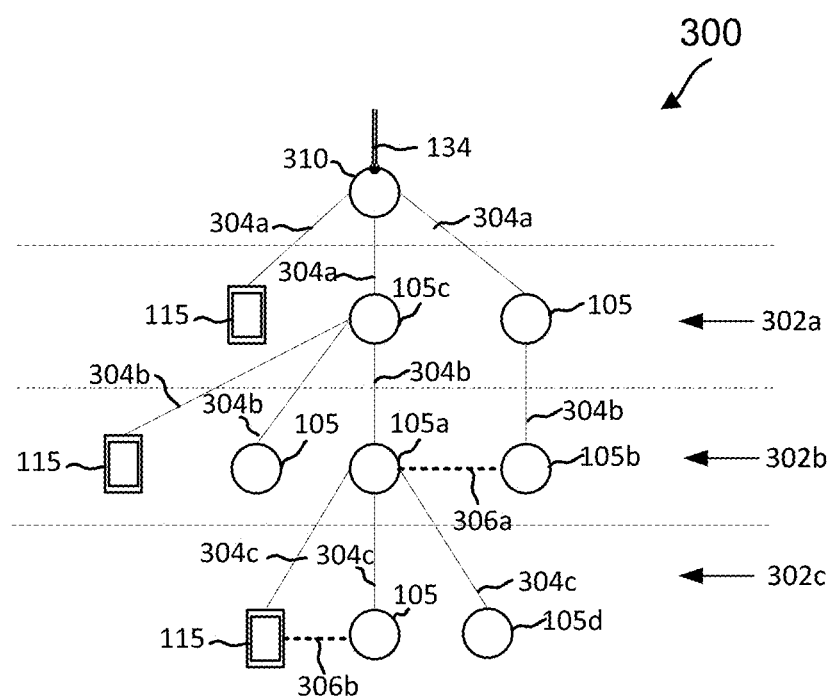
FIG. 3
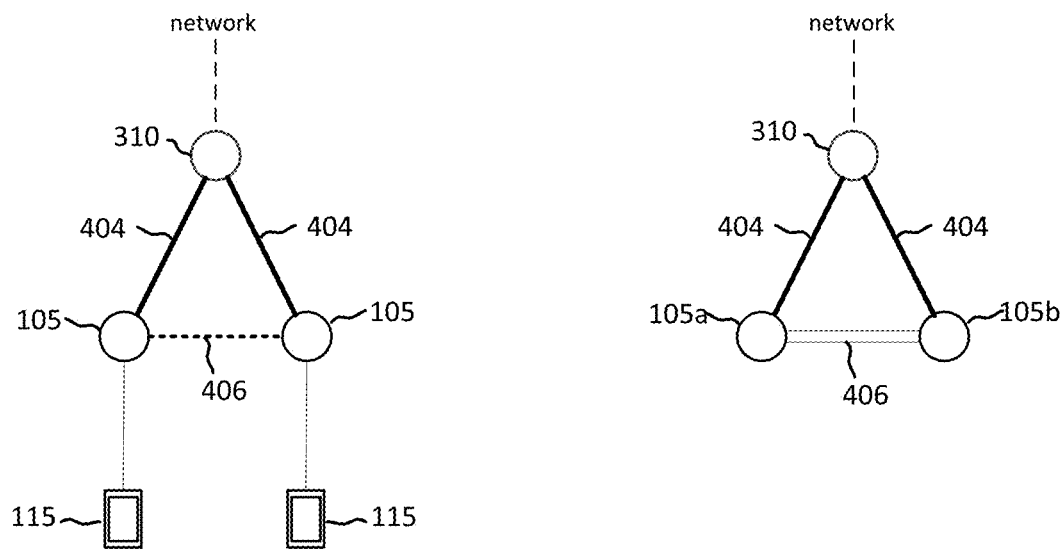
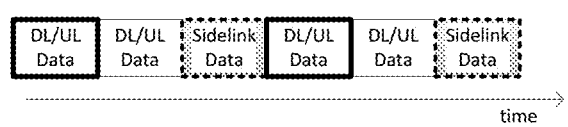
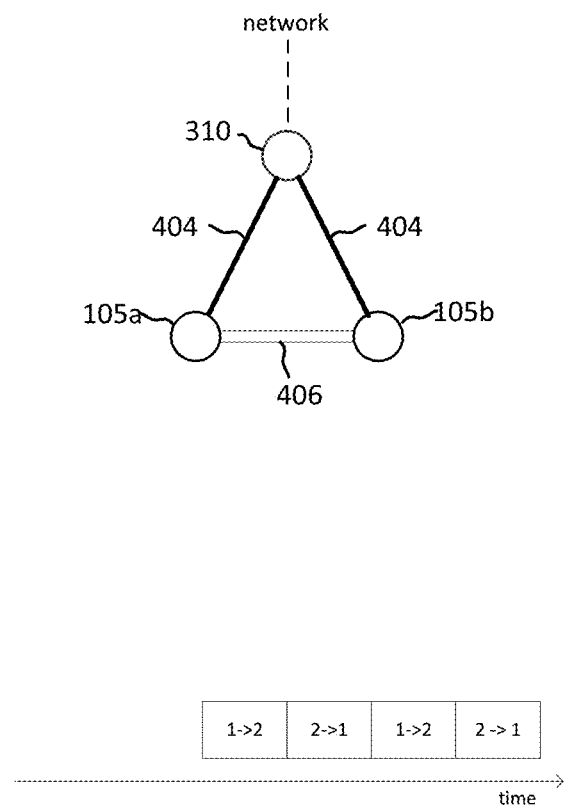
FIG. 4A
FIG. 4B

REPORTING AND SCHEDULING IN AN INTEGRATED ACCESS BACKHAUL NETWORK

CLAIM OF PRIORITY UNDER 35 U.S.C. § 119

The present Applications for patent claims priority to Provisional Application No. 62/722,332, entitled "REPORTING AND SCHEDULING IN AN INTEGRATED ACCESS BACKHAUL NETWORK" filed Aug. 24, 2018 and assigned to the assignee hereof and hereby expressly incorporated by reference herein

TECHNICAL FIELD

This application relates to wireless communication systems, and more particularly to communicating access data and backhaul data over wireless links in an integrated access backhaul (IAB) network. Embodiments enable and provide solutions and techniques for communication between wireless communication devices (e.g., base stations and user equipment devices (UEs)) in an IAB network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include several base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a fifth generation (5G) new radio (NR) technology. 5G NR may provide for access traffic and backhaul traffic at gigabit-level throughput. Access traffic refers to traffic between an access node (e.g., a base station) and a UE. Backhaul traffic refers to traffic between access nodes or traffic between an access node and a core network.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices.

In some aspects, a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the third transmission is transmitted by the second node and received by the first node.

In another aspect, a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the third transmission is transmitted by the first node and received by the second node.

In the foregoing aspects, each of the plurality of slots may include a control channel and a data channel, and the link quality information is transmitted in a control channel of the second slot or in a data channel of the second slot. In another aspect each of the plurality of slots includes a control channel and a data channel, and the ACK/NACK is transmitted in a control channel of the second slot or in a data channel of the second slot.

In some aspects a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the link quality information about the first transmission includes a least one or more combinations of CQI, reference signal received power (RSRP), signal to noise ratio (SNR), reference signal received quality (RSRQ), RSSI, beam index, beam coherence time, and beam quality.

In some aspects a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the second transmission includes an ACK/NACK for data transmitted during the first transmission.

In other aspects, a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the second transmission includes a scheduling request (SR) for the first device to send a fourth transmission to the second device. The SR may be transmitted in a control channel or in a data channel.

In other aspects, user equipment for wireless communications may include a radio transceiver; a processor; and a memory; wherein the processor is in electrical communication with the transceiver and the memory; and wherein the memory is configured with instructions to cause the processor to implement any of the methods of the preceding aspects.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 3 illustrates an IAB network topology according to embodiments of the present disclosure.

FIGS. 4A and 4B illustrate sidelink communications according to embodiments of the present disclosure.

DETAILED DESCRIPTION

Figure 1:
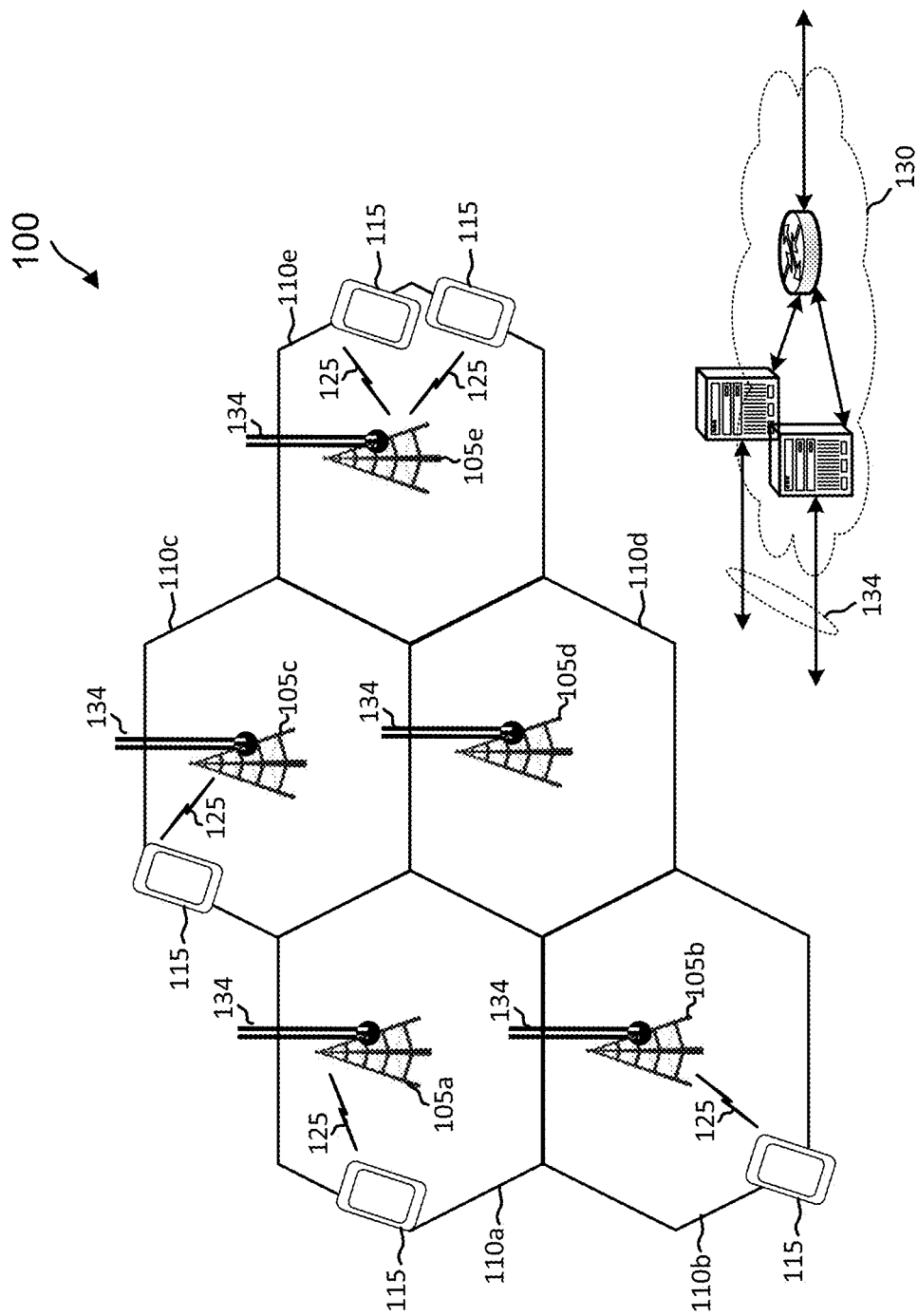
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

Techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWave bands) network.

The present disclosure describes mechanisms for communicating in an IAB network. An IAB network may include a combination of wireless access links between BSs and UEs and wireless backhaul links between the BSs. The IAB network may employ a multi-hop topology (e.g., a spanning tree) for transporting access traffic and backhaul traffic. One of the BSs may be configured with an optical fiber connection in communication with a core network, where the BS may function as an anchoring node (e.g., a root node) to transport backhaul traffic between the core network and the IAB network. The other BSs may be referred to as relay nodes in the network. Each BS may have one or more parent nodes, which may include other BSs, and/or one or more child nodes, which may include other BSs and/or UEs. The UEs may function as child nodes. In some embodiments, UEs may also function as relay nodes. The parent nodes may function as access nodes to the child nodes and may be referred to as access functionality (ACF)-nodes. The child nodes may function as UEs to the parent nodes and may be referred to as UE functionality (UEF)-nodes. Thus, a BS may function as an ACF-node when communicating with a child node and may function as a UEF-node when communicating with a parent node. The disclosed embodiments provide efficient mechanisms for communication between nodes in an IAB network. A pair of nodes for which one node is in the path of communication between the other node and the core network may be referred to as having a parent-child relationship.

In an embodiment, a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices.

In another embodiment, a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the third transmission is transmitted by the second node and received by the first node.

In another embodiment, a method of wireless communication may include transmitting, by the first wireless communication device, a first transmission to the second wireless device during a a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the third transmission is transmitted by the first node and received by the second node.

In the foregoing embodiment, each of the plurality of slots may include a control channel and a data channel, and the link quality information is transmitted in a control channel of the second slot or in a data channel of the second slot. In another aspect each of the plurality of slots includes a control channel and a data channel, and the ACK/NACK is transmitted in a control channel of the second slot or in a data channel of the second slot.

In some embodiments, a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the link quality information about the first transmission includes a least one or more combinations of CQI, reference signal received power (RSRP), signal to noise ratio (SNR), reference signal received quality (RSRQ), RSSI, beam index, beam coherence time, and beam quality.

In an embodiment, a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the second transmission includes an ACK/NACK for data transmitted during the first transmission.

In another embodiment, a method of wireless communication may include transmitting, by the first wireless communication device, a first transmission to the second wireless device during a first one of the plurality of slots; and receiving, by the first wireless communication device, a second transmission from the second wireless device during a second one of the plurality of slots, the second transmission including link quality information about the first transmission and scheduling a third transmission between the first and second wireless devices, wherein the second transmission includes a scheduling request (SR) for the first device to send a fourth transmission to the second device. The SR may be transmitted in a control channel or in a data channel.

In some embodiments, user equipment for wireless communications may include a radio transceiver; a processor; and a memory; wherein the processor is in electrical communication with the transceiver and the memory; and wherein the memory is configured with instructions to cause the processor to implement any of the methods of the preceding aspects.

The forgoing aspects of the present application can provide several benefits. For example, routing data through sidelinks may reduce the number of hops needed to get data to its destination, thereby reducing latency and improving reliability. Using sidelink may also improve overall network capacity by reducing the amount of traffic in uplink or downlink transmissions.

FIG. 1 illustrates a wireless communication network 100 including a plurality of BSs 105, a plurality of UEs 115, and a core network 130. The network 100 may be an LTE network, an LTE-A network, a millimeter wave (mmW) network, a new radio (NR) network, a 5G network, or any other successor network to LTE.

The BSs 105 may wirelessly communicate with the UEs 115 via one or more BS antennas. Each BS 105 may provide communication coverage for a respective geographic coverage area 110. In 3GPP, the term "cell" can refer to this geographic coverage area of a BS and/or a BS subsystem serving the coverage area, depending on the context in which the term is used. In the example shown in FIG. 1, the BSs 105a, 105b, 105c, 105d, and 105e are examples of macro BSs for the coverage areas 110a, 110b, 110c, 110d, and 110e, respectively.

Communication links 125 shown in the network 100 may include uplink (UL) transmissions from a UE 115 to a BS 105, or downlink (DL) transmissions, from a BS 105 to a UE 115. The communication links 125 are referred to as wireless access links. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another via optical fiber links 134. The core network 130 may provide user authentication, access authorization, tracking, Internet Protocol (IP) connectivity, and other access, routing, or mobility functions. At least some of the BSs 105 (e.g., which may be an example of an evolved NodeB (eNB), a next generation NodeB (gNB), or an access node controller (ANC)) may interface with the core network 130 through the backhaul links 134 (e.g., S1, S2, etc.) and may perform radio configuration and scheduling for communication with the UEs 115. In various examples, the BSs 105 may communicate, either directly or indirectly (e.g., through core network 130), with each other over the backhaul links 134 (e.g., X1, X2, etc.).

Each BS 105 may also communicate with other UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

Figure 2:
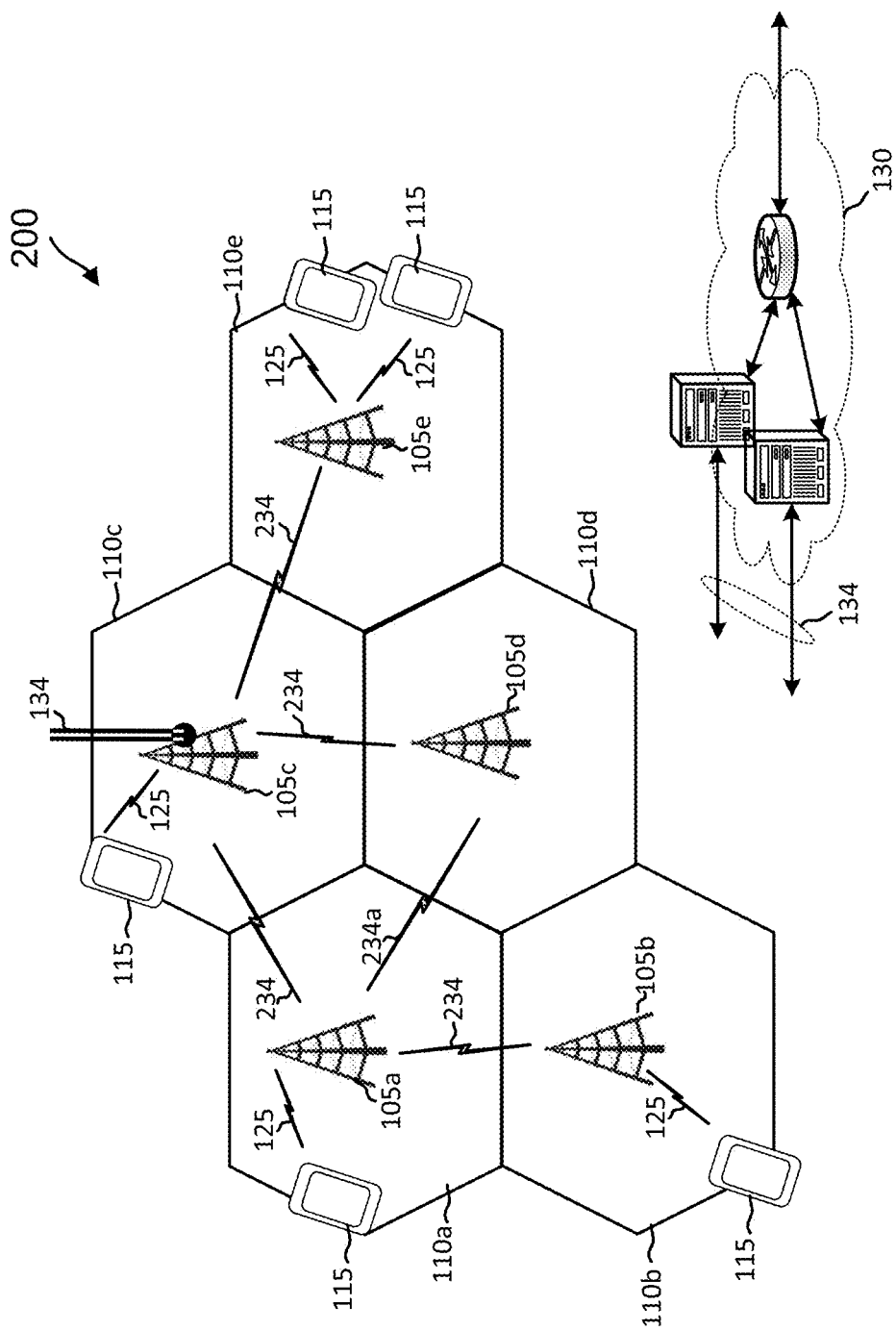
FIG. 2 illustrates an integrated access backhaul (IAB) network according to embodiments of the present disclosure.

FIG. 2 illustrates an IAB network 200 according to embodiments of the present disclosure. The network 200 is substantially similar to the network 100 in many respects. For example, the BSs 105 communicates with the UEs 115 over the wireless access links 125. However, in the network 200, only some BSs (e.g., the BS 105c) are connected to the core network by high capacity link, such as optical fiber backhaul link 134. Other BSs 105a, 105b, 105d, and 105e wirelessly communicate with each other and with the BS 105c over wireless backhaul links 234. The BS 105c connected to the optical fiber backhaul link 134 may function as an anchor for the other BSs 105a, 105b, 105d, and 105e to communicate the core network 130, as described in greater detail herein. The wireless access links 125 and the wireless backhaul links 234 may share resources for communications in the network 200. The network 200 may also be referred to as a self-backhauling network. The network 200 can improve wireless link capacity, reduce latency, and reduce deployment cost.

In an embodiment, network 200 may use millimeter wave (mmWav) frequency bands for communications. In such a network, some of BSs 105a, 105b, 105d, and 105e may communicate with each other and with BS 105c using narrow directional beams for wireless links 234. The BSs 105 may also communicate with the UEs 115 using narrow directional beams for wireless links 125. The directional beams for links 234 may be substantially like the directional beams for links 125. For example, the BSs 105 may use analog beamforming and/or digital beamforming to form the directional beams for transmission and/or reception. Similarly, UEs 115 may use analog beamforming and/or digital beamforming to form the directional beams for transmission and/or reception. Using narrow directional beams may minimize or reduce inter-link interference, thereby increasing network throughput and reducing latency. Thus, the use of mmWav can improve system performance.

In some implementations, the networks 100 and 200 may use orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into subbands.

In an embodiment, the BSs 105 can assign or schedule transmission resources (e.g., in the form of time-frequency resource blocks) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a predefined pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

FIG. 3 illustrates a network topology 300 according to embodiments of the present disclosure. The topology 300 can be employed by the network 200. For example, the BSs 105 and the UEs 115 can be configured to form a logical spanning tree configuration as shown in the topology 300 for communicating access traffic and/or backhaul traffic. The topology 300 may include an anchor 310 coupled to an optical fiber link 134 for communication with a core network (e.g., the core network 130). The anchor 310 may correspond to the BS 105c in the network 200.

The topology 300 includes a plurality of logical levels 302. In the example of FIG. 3, the topology 300 includes three levels 302, shown as 302a, 302b, and 302c. In some other embodiments, the topology 300 can include any suitable number of levels 302 (e.g., two, three, four, five, or six, etc.). Each level 302 may include a combination of UEs 115 and BSs 105 interconnected by logical links 304, shown as 304a, 304b, and 304c. For example, a logical link 304 between a BS 105 and a UE 115 may correspond to a wireless access link 125, whereas a logical link 304 between two BSs 105 may correspond to a wireless backhaul link 234. The BSs 105 and the UEs 115 may be referred to as relay nodes in the topology 300.

The nodes (e.g., the BSs 105) in the level 302*a* can function as relays for the nodes in the level 302*b*, for example, to relay backhaul traffic between the nodes and the anchor 310. Similarly, the nodes (e.g., the BSs 105) in the level 302*b* can function as relays for the nodes in the level 302*c*. For example, the nodes in the level 302*a* are parent nodes to the nodes in the level 302*b*, and the nodes in the level 302*c* are child nodes to the nodes in level 302*b*. The parent nodes may function as ACF-nodes and the child nodes may function as UEF-nodes.

For example, a BS 105 may implement both ACF and UEF and may function as an ACF-node and an UEF-node depending on which node the BS is communicating with. For example, a BS 105 (shown as pattern-filled) in the level 302*b* may function as an access node when communicating with a BS 105 or a UE 115 in the level 302*c*. Alternatively, the BS 105 may function as a UE when communicating with a BS 105 in the level 302*a*. When a communication is with a node in a higher level or with a smaller number of hops to the anchor 310, the communication is referred to as a UL communication. When a communication is with a node in a lower level or with a greater number of hops to the anchor 310, the communication is referred to as a DL communication. In some embodiments, the anchor 310 may allocate resources for the links 304. Mechanisms for scheduling UL and DL transmissions and/or allocating resources based on the topology 300 are described in greater detail herein.

In addition to logical links 304, network topology 300 may also include additional links 306 between BSs 105. Links 306 may link BSs that do not have a parent-child relationship in network topology 300 and may link arbitrary BSs in the same or different layers of the topology. Advantageously, links 306, referred to as sidelinks herein, may provide an alternate path for routing communications between BSs 105 and UEs 115. For example, with sidelink 306, communications between UE 115*a* and UE 115*b* may be routed from BS 105*a* to BS 105*b* via sidelink 306, rather than up through layers 302*b* and 302*a* to anchor 310 then back down to UE 155*b*.

FIGS. 4A and 4B show possible resource partitioning in accordance with aspects disclosed herein. In an aspect, networks may be constrained interference between nearby BSs and other considerations, such as half-duplex constraints. For example, UL/DL transmissions between BS 310 and BSs 105 may be scheduled during a first slot, or time period, while UL/DL transmissions between BSs 105 and UEs 115, may be scheduled during a different slot. Typically, such slots alternate between transmitting and receiving. In an aspect, a third slot may be used for side link communication. This is shown in FIG. 4A, wherein available resources are partitioned between DL, UL and sidelink communications as shown by the line style if the link. The resources may be rotated between the different types of communications in a round robin, or other scheduling scheme.

In another aspect, a BSs 105 may be able to use beam forming techniques to communicate with neighboring BSs. The use of narrow beams reduces interference to other wireless devices in the network. In such a network, BSs 105 may communicate without requiring resource allocation from the typical UL/DL slots. This is shown in FIG. 4B, wherein BSs 105*a* and 105*b* transmit to each other in alternate slots. That is, BS 105*a* transmits to BS 105*b* in a first set of slots, 1→2, and BS 105*b* transmits to BS 105*a* during a second set of slots, 2→1. In an aspect, the slots need not alternate in a fixed 1:1 ratio, but may vary based on load, QoS, and other factors.

Figure 5A:
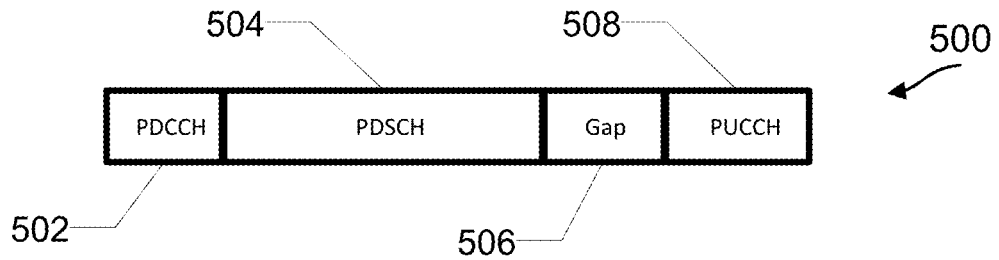
FIGS. 5A, 5B, and 5C illustrate various slot formats that may be used for communications between the nodes of FIGS. 1 and 2.
Figure 5B:
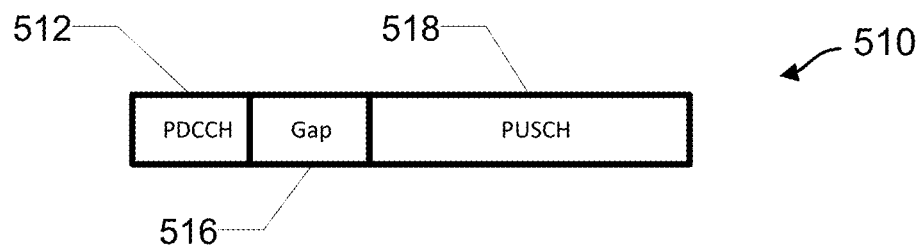
Figure 5C:
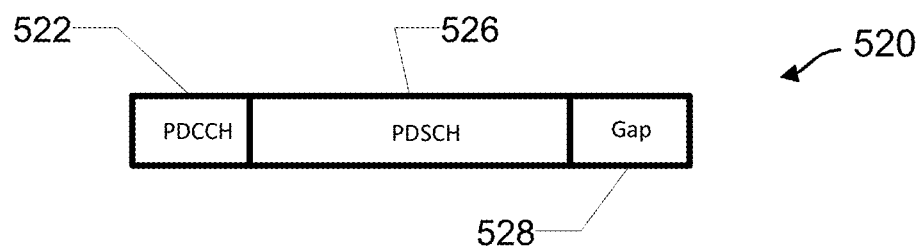

FIGS. 5A, 5B, and 5C illustrate various slot formats that may be used for communications between the nodes of FIGS. 1 and 2. FIG. 5A shows exemplary downlink (DL) centric slot 500 which may be used for transmitting from a higher level node to a lower level node, e.g. BS 105 to UE 115*a* in FIG. 1 or 2. DL centric slot 500 includes PDCCH 502, PDSCH 504, gap 506 and PUCCH 508. PDCCH 502 is used to send control information such as DL/UL resource assignments, power control commands, paging indicators, and the like, whereas PDSCH 504 carries application data. Gap 506 provides time for the receiving device, e.g., UE 115, to process PDCCH 502 and PDSCH 504 and to reconfigure for transmitting. PUCCH 502 may be used for the receiver to send uplink control information, such as ACK/NACK and power control signaling back to the sender.

FIG. 5B illustrates uplink (UL) centric slot 510 which may be used for transmissions from a lower order node to a higher order node. UL centric slot 510 may include PDCCH 512, gap 516, and PUSCH 518. PUSCH may be used to send data, such as application data. Gap 516 provides time for the receiving device, e.g., UE 115, to process PDCCH 512 to determine which resources it is allocated in PUSCH 518 and to turn it transceiver from a receiving mode to a transmitting mode.

FIG. 5C illustrates sidelink (SL) centric slot 520 which may be used for transmissions between nodes that are at the same order or level in the network topology. Sidelink slot 520, may be used for communications between nodes that are not otherwise directly linked by the logical topology of a network. Sidelink slot 520 includes PDCCH 522 and PDSCH 524, which serve similar roles to the corresponding slots of downlink centric slot 500 of FIGS. 5A and 5B. SL centric slot 520 may include PDCCH 522, PDSCH 528, gap 526. PDSCH may be used to send data, such as application and other data between BSs 105. Gap 526 provides time for the receiving device, e.g., UE 115, to process data in PDSCH 526 and to turn it transceiver from a receiving mode to a transmitting mode in anticipation or transmitting data in the reverse direction.

Figure 6:
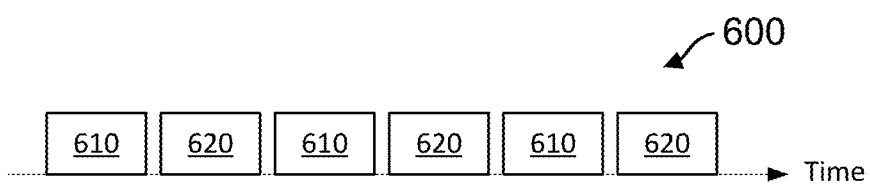
FIG. 6 illustrates an IAB network resource sharing method according to embodiments of the present disclosure.

FIG. 6 illustrates an IAB network resource sharing method 600 according to embodiments of the present disclosure. The method 600 illustrates resource partitioning for use in the topology 300. In FIG. 6, the x-axis represents time in some constant units (e.g., frames, slots, subslots, msec, symbols, etc.). The method 600 time-partitions resources in an IAB network (e.g., the network 200) into resources 610 and 620. The resources 610 and 620 can include time-frequency resources. For example, each resource 610 or 620 may include a number of symbols (e.g., OFDM symbols) in time and a number of subcarriers in frequency. In some embodiments, each resource 610 or 620 shown may correspond to a subframe, a slot, or a transmission time interval (TTI), which may carry one media access control (MAC) layer transport block.

As will be discussed below, sidelink resources may alternate direction for transmissions: first from BS 105*a* to BS 105*b* and then the reverse. Accordingly, rather than providing PUCCH and PUSCH for sidelink slots, the information normally carried in these channels may be carried in the PDCCH or PDSCH when the direction of transmission is reversed.

As an example, the method 600 may assign the resources 610 to the links 304*a* and 304*c* in the topology 300 for communicating UL and/or DL traffic. The method 600 may assign the resources 620 to the links 304b in the topology 300 for communicating UL and/or DL traffic. The time-partitioning of the resources in the alternating manner shown in the method 600 can reduce interference between the different levels 302, reducing constraints due to half-duplexing, and reduce transmit-receive gap periods.

Figure 7A:
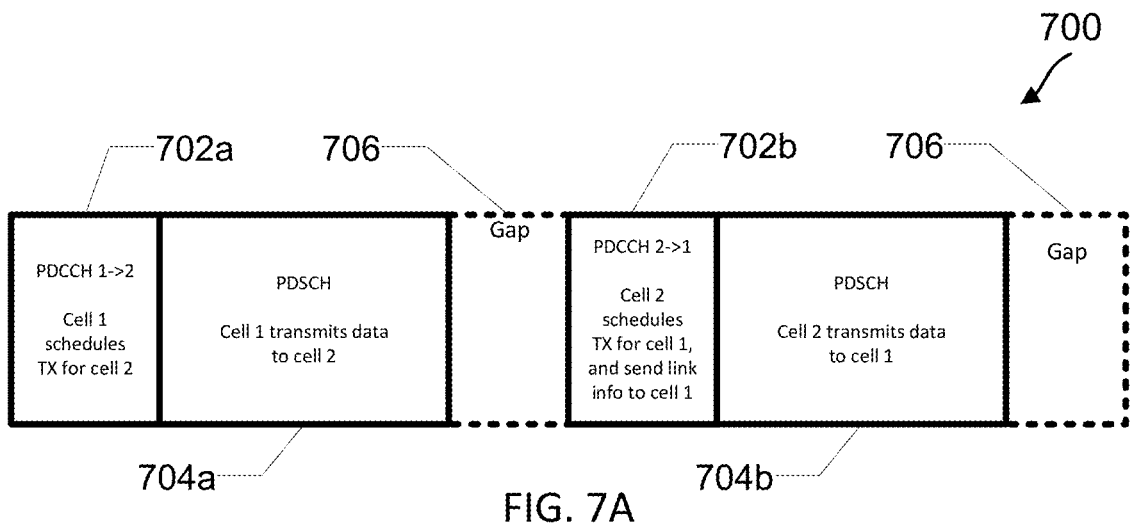
FIGS. 7A to 7D illustrate various aspects of communicating data and control information in sidelink formatted slots according to embodiments of the present disclosure.
Figure 7B:
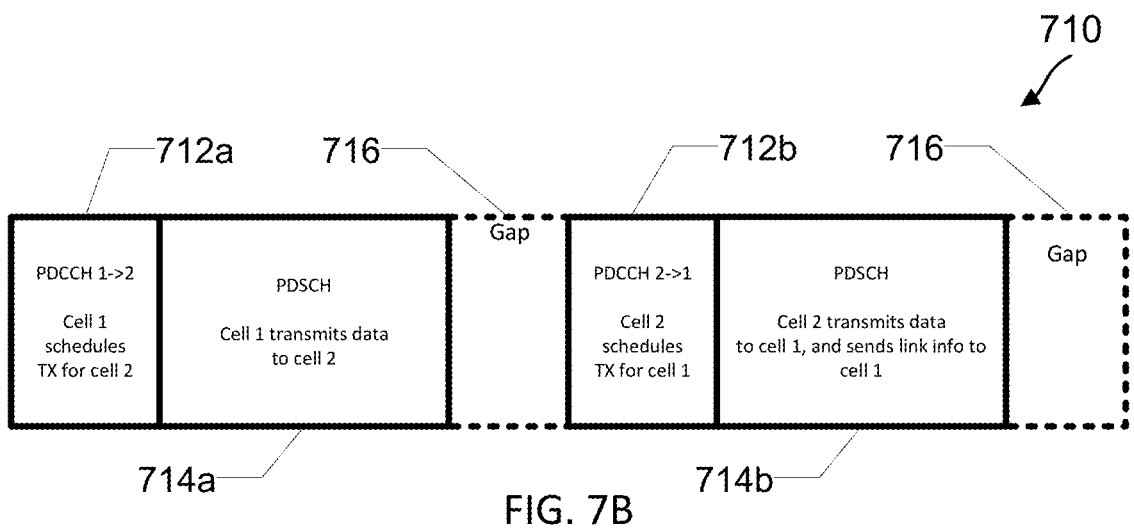
Figure 7C:
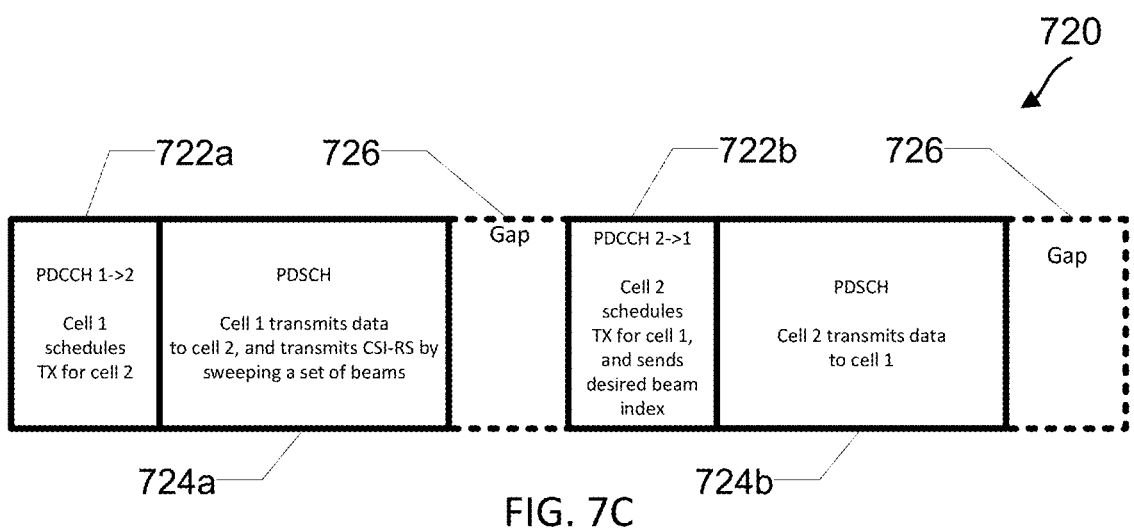

FIGS. 7A to 7C illustrate various aspects of communicating data and control information in sidelink formatted slots. In a first aspect, shown in FIG. 7A, BS 105a transmits PDCCH 702a including scheduling information about which resources in PDSCH 704a contain data being transmitted to BS 105b. BS 105a subsequently transmits the data in PDSCH 704a in accordance with the scheduling information transmitted during PDCCH 702a. BS 105b, having received the scheduling information in PDCCH 702a, decodes PDSCH 704a to receive the data communicated from BS 105a. After gap 706, BS 105b transmits scheduling information and data during PSCCH 702b and PDSCH 704b. In addition, BS 105b may also transmit control information during PDCCH 702b, such as link quality information and ACK/NACK information. In another aspect, BS 105b may transmit the control information during PDSCH 714b rather than during PDCCH 712b, as shown in FIG. 7C.

In an aspect, additional signals and control information may be needed in a narrow beam mmWave environment. For example, BSs 105a and 105b may need to be able to determine which beam(s) to use for communication. In an aspect, BS 105a may transmit CSI-RS during PDSCH 724a by sending CSI-RS signaling over multiple beams in a sweeping manner. BS 105b may communication a desired beam index during subsequent PDCCH 722b, as shown in FIG. 7C. In an aspect, BS 105b may alternately communicate beam selection information during PDSCH 724b. The preceding described transmissions from BS 105a to BS 105b, whereas one skilled in the art will understand that transmissions in the reverse direction, e.g., from BS 105b to BS 105a, are made in an analogous manner.

Figure 8:
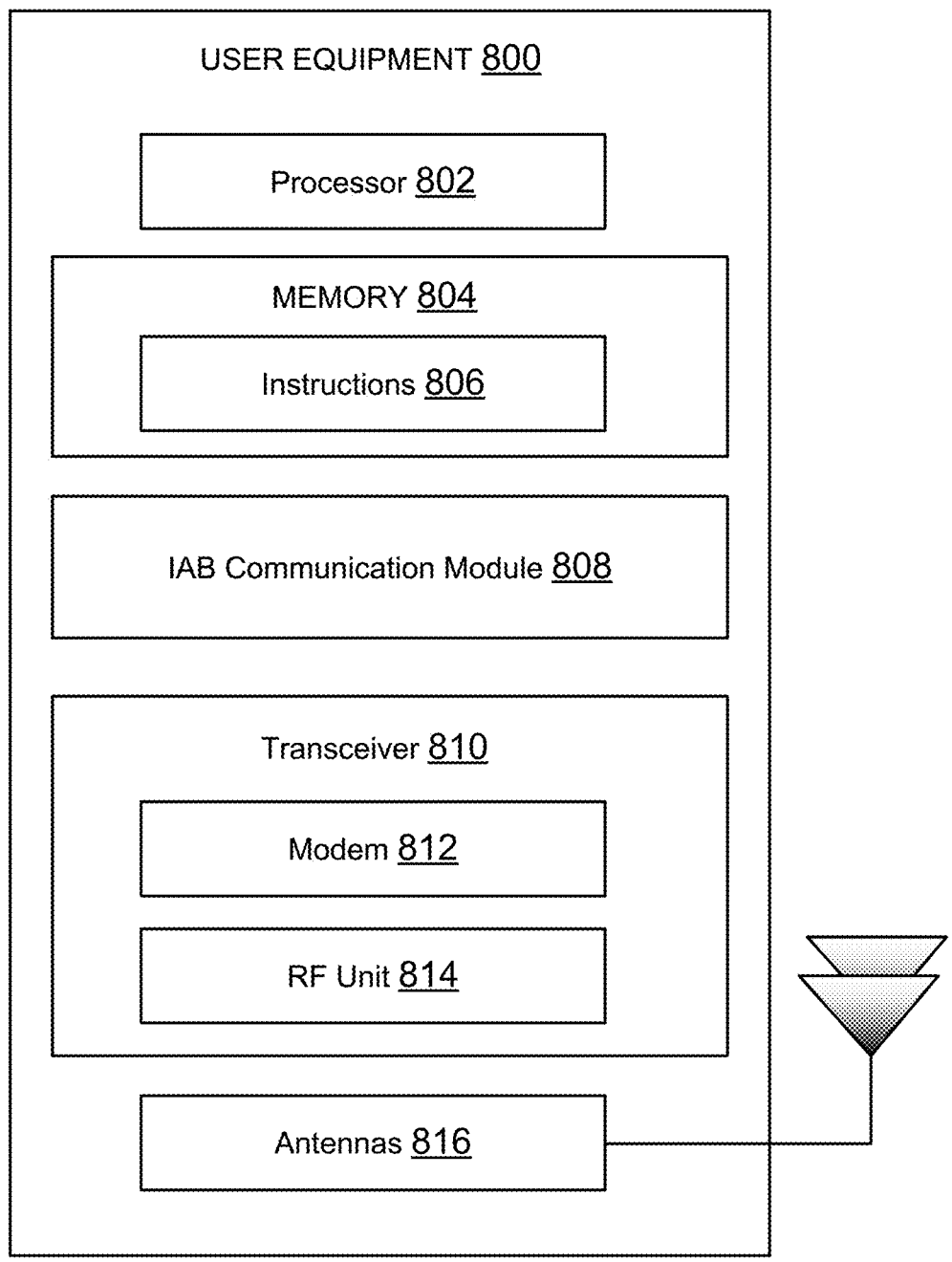
FIG. 8 is a block diagram of an exemplary user equipment (UE) according to embodiments of the present disclosure.

In an aspect of the invention, sidelink resources 830 may be interspersed with uplink resources 810 and downlink resources 820, as shown in FIG. 8, so that gap 726 does not explicitly need to be included in the sidelink slot format. In another aspect, narrow beam mmWave transmissions may obviate the need to time multiplex resources 810, 820, and 830.

Regular PUCCH channels include information needed for downlink transmissions, such as ACK/NAK of downlink traffic, channel quality information (e.g., CQI, RSRP, PMI), scheduling requests, beam index reports, and beam quality reports, among others. Because the sidelink slot format does not include a PUCCH, this information is conveyed through other mechanisms. In one aspect, the PUCCH-type information is conveyed in the PDCCH when a sidelink transmission is sent in the reverse direction. For example, when BS 105b received a transmission from BS 105a, the information usually sent during PUCCH is transmitted in the PDCCH when BS 105b transmits to BS 105a. Advantageously, control channels are typically more robust than data channels. In another aspect, the PUCCH-type information may be conveyed in the PDSCH when a sidelink transmission is sent in the reverse direction. For example, when BS 105b receives a transmission from BS 105a, the information usually sent during PUCCH may transmitted in PDSCH when BS 105b transmits to BS 105a.

Figure 7D:
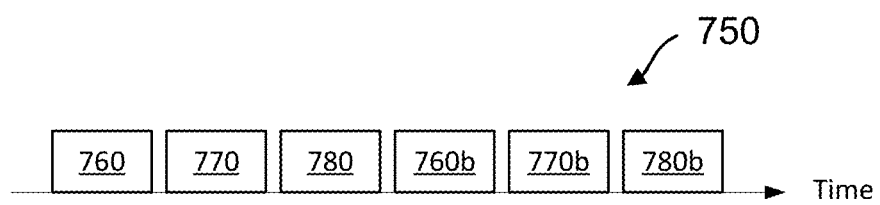

FIG. 7D illustrates resource sharing in an IAB network, such as the topology 300, according to embodiments of the present disclosure. In FIG. 7D, the x-axis represents time in some constant units (e.g., frames, slots, subslots, msec, etc.). As shown, resources in an IAB network (e.g., the network 200) are time-partitioned into resources 760, 770, and 780. The resources may include time-frequency resources. For example, each resource 760, 770, and 780 may include a number of symbols (e.g., OFDM symbols) in time and a number of subcarriers in frequency. In some embodiments, each resource 760, 770, and 780 shown may correspond to a subframe, a slot, a transmission time interval (TTI), or other convenient interval, which may carry one media access control (MAC) layer transport block.

As an example, in topology 300 of FIG. 3, resources 760 may be assigned to links 304a and 304c for communicating UL and/or DL traffic; the resources 770 may be assigned to the links 304b for communicating UL and/or DL traffic; and the resources 780 may be assigned to 306 for communicating sidelink traffic. The time-partitioning of the resources in the alternating manner shown in FIG. 7D can reduce interference between the different levels 302, overcome the half-duplex constraint, and reduce transmit-receive gap periods.

In an aspect of the present invention, resource partitioning to provide sidelink 306 is done at a node or anchor having a higher order than the nodes sharing sidelink 306, that is, one at a higher level in network topology 300. In an aspect, the resource partitioning is done at a common parent of the two nodes using the sidelink. For instance, anchor 310 may partition network resources into resources 310, 320, and 330 for all the nodes in FIG. 3. Partitioning may also be done by non-anchor nodes that are higher than the nodes using the sidelink.

In an aspect of setting up sidelink 306, the direction of communication between BSs 105a and 105b will typically alternate. That is a resource partition may be used for transmission of data from BS 105a to BS 105b, then a subsequent resource partition may be used for transmissions from BS105b to BS105a. In some embodiments, the resource partitions may be substantially the same size in terms of time, bandwidth, and the like. In other embodiments, the resource partitions may have different sizes to accommodate different data rates, bandwidth, channel conditions, reliability, quality of service, etc. For example, transmitting video from UE 115a to UE 115b may require larger partitions or more partitions for transmission of data from BS 105a to BS 105b than are needed to transmit control information in the reverse direction from BS 105b to BS 105a.

FIG. 8 is a block diagram of an exemplary UE 800 according to embodiments of the present disclosure. The UE 800 may be a UE 115 as discussed above. As shown, the UE 800 may include a processor 802, a memory 804, an IAB communication module 808, a transceiver 810 including a modem subsystem 812 and a radio frequency (RF) unit 814, and one or more antennas 816. These elements may be in direct or indirect communication with each other, for example via one or more buses.

The processor 802 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 804 includes a non-transitory computer-readable medium. The memory 804 may store instructions 806. The instructions 806 may include instructions that, when executed by the processor 802, cause the processor 802 to perform the operations described herein with reference to the UEs 115 in connection with embodiments of the present disclosure. Instructions 806 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The IAB communication module 808 may be implemented via hardware, software, or combinations thereof. For example, the IAB communication module 808 may be implemented as a processor, circuit, and/or instructions 806 stored in the memory 804 and executed by the processor 802. The IAB communication module 808 may be used for various aspects of the present disclosure. For example, the IAB communication module 808 is configured to maintain multiple synchronization references, provide synchronization information (e.g., including timing and/or frequency) associated with the synchronization references to other nodes (e.g., the BSs 105), receive synchronization information from other nodes, receive synchronization adjustment commands, receive scheduling information (e.g., gap periods, transmission timing, and/or reception timing), adjust synchronization references based on the received synchronization information and/or the received commands, and/or communicate with other nodes based on received scheduling information, as described in greater detail herein.

As shown, the transceiver 810 may include the modem subsystem 812 and the RF unit 814. The transceiver 810 can be configured to communicate bi-directionally with other devices, such as the BSs 105. The modem subsystem 812 may be configured to modulate and/or encode the data from the memory 804 and/or the IAB communication module 808 according to a modulation and coding method (MCS), e.g., a low-density parity check (LDPC) coding method, a turbo coding method, a convolutional coding method, a digital beamforming method, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together at the UE 115 to enable the UE 115 to communicate with other devices.

The RF unit 814 may provide the modulated and/or processed data, e.g. data packets (or, more generally, data messages that may contain one or more data packets and other information), to the antennas 816 for transmission to one or more other devices. This may include, for example, transmission of reservation signals, reservation response signals, and/or any communication signal according to embodiments of the present disclosure. The antennas 816 may further receive data messages transmitted from other devices. This may include, for example, reception of synchronization information, synchronization adjustment commands, and/or scheduling adjustment information according to embodiments of the present disclosure. The antennas 816 may provide the received data messages for processing and/or demodulation at the transceiver 810. The antennas 816 may include multiple antennas of similar or different designs in order to sustain multiple transmission links. The RF unit 814 may configure the antennas 816.

Figure 9:
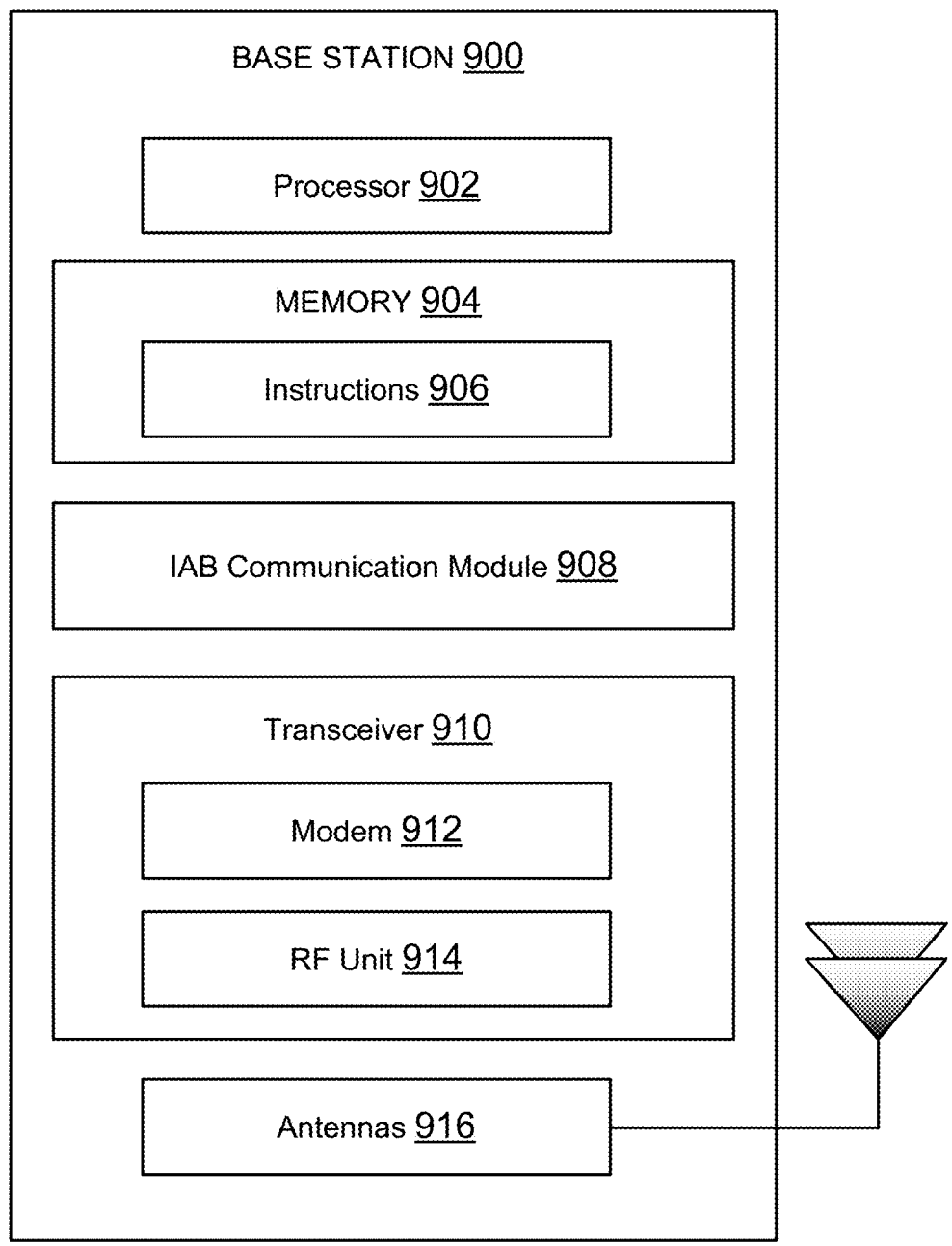
FIG. 9 is a block diagram of an exemplary base station (BS) according to embodiments of the present disclosure.

FIG. 9 is a block diagram of an exemplary BS 900 according to embodiments of the present disclosure. The BS 900 may be a BS 105 as discussed above. A shown, the BS 900 may include a processor 902, a memory 904, an IAB communication module 908, a transceiver 910 including a modem subsystem 912 and a RF unit 914, and one or more antennas 916. These elements may be in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 904 may include a non-transitory computer-readable medium. The memory 904 may store instructions 906. The instructions 906 may include instructions that, when executed by the processor 902, cause the processor 902 to perform operations described herein. Instructions 906 may also be referred to as code, which may be interpreted broadly to include any type of computer-readable statement(s) as discussed above with respect to FIG. 7.

The IAB communication module 908 may be implemented via hardware, software, or combinations thereof. For example, the IAB communication module 908 may be implemented as a processor, circuit, and/or instructions 906 stored in the memory 904 and executed by the processor 902. The IAB communication module 908 may be used for various aspects of the present disclosure. For example, the IAB communication module 908 is configured to maintain multiple synchronization references, provide synchronization information (e.g., including timing and/or frequency) associated with the synchronization references to other nodes (e.g., the BSs 105 and the UEs 115 and 800), receive synchronization information from other nodes, receive synchronization adjustment commands, adjust synchronization references based on the received synchronization information or the received commands, receive scheduling information (e.g., gap periods, transmission timing, and/or reception timing) for communication with nodes at a higher level (e.g., less hops away from an anchor 115*c* than the BS 115), determine scheduling information for communication with nodes at a lower level (e.g., more hops away from an anchor 115*c* than the BS 115), and/or communicate with nodes based on the received scheduling information and the determined scheduling information, as described in greater detail herein.

As shown, the transceiver 910 may include the modem subsystem 912 and the RF unit 914. The transceiver 910 can be configured to communicate bi-directionally with other devices, such as the UEs 115 and/or another core network element. The modem subsystem 912 may be configured to modulate and/or encode data according to a MCS, e.g., a LDPC coding method, a turbo coding method, a convolutional coding method, a digital beamforming method, etc. The RF unit 514 may be configured to process (e.g., perform analog to digital conversion or digital to analog conversion, etc.) modulated/encoded data from the modem subsystem 912 (on outbound transmissions) or of transmissions originating from another source such as a UE 115. The RF unit 914 may be further configured to perform analog beamforming in conjunction with the digital beamforming. Although shown as integrated together in transceiver 910, the modem subsystem 912 and the RF unit 914 may be separate devices that are coupled together at the BS 105 to enable the BS 105 to communicate with other devices.

The RF unit 914 may provide the modulated and/or processed data, e.g. data packets (or, more generally, data messages that may contain one or more data packets and other information), to the antennas 916 for transmission to one or more other devices. This may include, for example, transmission of information to complete attachment to a network and communication with a camped UE 115 according to embodiments of the present disclosure. The antennas 916 may further receive data messages transmitted from other devices and provide the received data messages for processing and/or demodulation at the transceiver 910. The antennas 916 may include multiple antennas of similar or different designs in order to sustain multiple transmission links.

Figure 10:
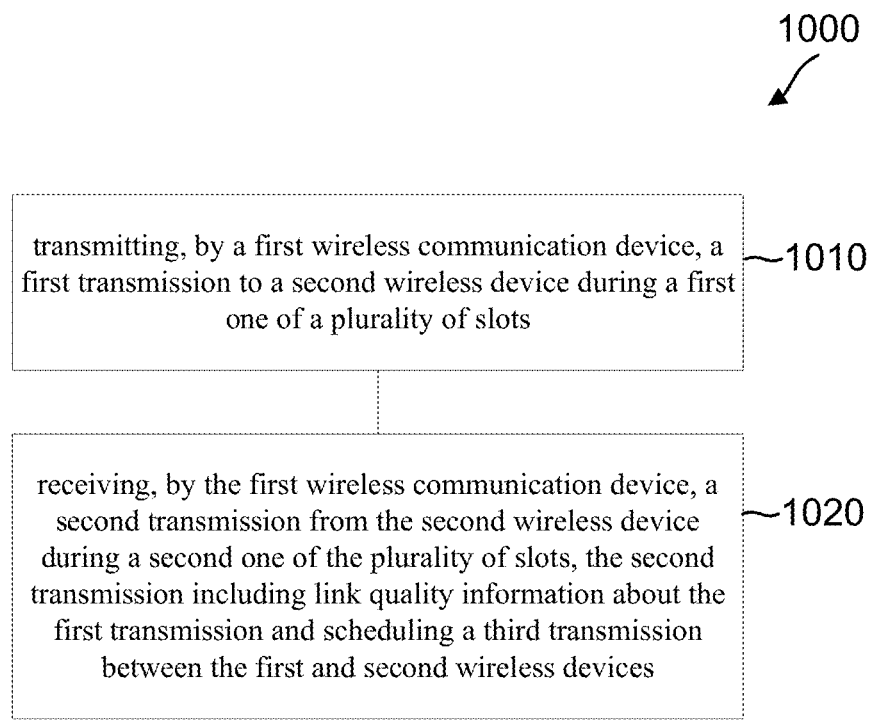
FIG. 10 illustrates a method of communication using sidelinks according to embodiments of the present disclosure.

FIG. 10 is a flow diagram of a method 1000 for communicating in an IAB network according to embodiments of the present disclosure. The network may be similar to the networks 100 and 200; and may be configured with the topology 300. Steps of the method 1000 can be executed by a computing device (e.g., a processor, processing circuit, and/or other suitable component) of a wireless communication device, such as the BSs 105 and 800 and the UEs 115 and 900. The method 1000 may employ similar mechanisms as described with respect to FIGS. 3 to 9. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes transmitting, by the first wireless communication device, a first transmission to the second wireless device during a first one of the plurality of slots.

At step 1020, the method 1000 includes receiving, by the first wireless communication device, a second transmission from the second wireless device during a second one of the plurality of slots, the second transmission including link quality information about the first transmission and scheduling a third transmission between the first and second wireless devices.

In a first aspect, the first wireless communication device transmits a first transmission to a second wireless device during a first one of a plurality of slots; and receives a second transmission from the second wireless device during a second one of the plurality of slots, the second transmission including link quality information about the first transmission and scheduling a third transmission between the first and second wireless devices. In an aspect, the first and second wireless devices do not have a parent child relationship.

In a second aspect, in combination with the first aspect, the first wireless communication device may receive the third transmission from the second wireless communication device. In a third aspect, in combination with the first aspect, the first wireless communication device may transmit the third transmission from the second wireless communication device.

In a fourth aspect, in combination with any of the first to third aspects, the link quality information about the first transmission includes a least one or more combinations of CQI, reference signal received power (RSRP), signal to noise ratio (SNR), reference signal received quality (RSRQ), RSSI, beam index, beam coherence time, and beam quality.

In a fifth aspect, in combination with any of the first to fourth aspects, the second transmission includes one or more of an ACK/NACK for data transmitted during the first transmission, and a scheduling request (SR) for a subsequent communication between the first and second wireless communication devices.

In a sixth aspect, in combination with any of the first to fifth aspects, each of the plurality of slots includes a control channel and a data channel, and the first wireless device is configured to receive one or more of the link quality information, the ACK/NACK, and the SR in one of the control channel or the data channel of the second slot.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication by a first wireless communication device with a second wireless communication device that does not have a parent-child relationship with the first wireless communication device because the first wireless communication device is not in a path of communication between the second wireless communication device and a core network, the method comprising:
    transmitting, by the first wireless communication device, a first transmission to the second wireless communication device during a first one of a plurality of slots;
    receiving, by the first wireless communication device, a second transmission from the second wireless communication device during a second one of the plurality of slots, the second transmission including link quality information about the first transmission and scheduling a third transmission between the first wireless communication device and the second wireless communication device, wherein the link quality information about the first transmission includes at least one or more combinations of beam index, or beam coherence time;
    receiving data, using the first wireless communication device, from the second wireless communication device via a sidelink formatted slot; and
    transmitting, using the first wireless communication device, to the second wireless communication device via the sidelink formatted slot, a physical downlink control channel (PDCCH) comprising an ACK/NACK associated with the data received from the second wireless communication device or a physical downlink shared channel (PDSCH) comprising the ACK/NACK associated with the data received from the second wireless communication device.

2. The method of claim 1, further comprising receiving by the first wireless communication device the third transmission from the second wireless communication device.

3. The method of claim 1, further comprising transmitting by the first wireless communication device the third transmission to the second wireless communication device.

4. The method of claim 1, wherein the second transmission includes one or more of an ACK/NACK for data transmitted during the first transmission, or a scheduling request (SR) for a subsequent communication between the first and second wireless communication devices.

5. The method of claim 4, wherein each of the plurality of slots includes a control channel and a data channel, and the first wireless communication device is configured to receive one or more of the link quality information, the ACK/NACK, or the SR in one of the control channel or the data channel of the second slot.

6. A wireless communication apparatus comprising:
    a transceiver;
    a processor; and
    a memory containing instruction for causing the processor to
    transmit a first transmission to another wireless device during a first one of a plurality of slots, wherein the apparatus does not have a parent-child relationship with the other wireless communication device because the apparatus is not in a path of communication between the other wireless communication device and a core network;
    receive a second transmission from the other wireless device during a second one of the plurality of slots, the second transmission including link quality information about the first transmission and scheduling a third transmission between the apparatus and the other wireless communication device, wherein the link quality information about the first transmission includes at least one or more combinations of beam index, or beam coherence time;
    receive data from the other wireless communication device via a sidelink formatted slot; and
    transmit, to the other wireless communication device via the sidelink formatted slot, a physical downlink control channel (PDCCH) comprising an ACK/NACK associated with the data received from the other wireless communication device or a physical downlink shared channel (PDSCH) comprising the ACK/NACK associated with the data received from the other wireless communication device.

7. The apparatus of claim 6, wherein the memory further includes instructions for causing the processor to receive the third transmission from the other wireless communication device.

8. The apparatus of claim 6, wherein the memory further includes instructions for receiving, in the second transmission, one or more of an ACK/NACK for data transmitted during the first transmission, or a scheduling request (SR) for a subsequent communication.

9. The apparatus of claim 8, wherein each of the plurality of slots includes a control channel and a data channel, and the memory further includes instructions for causing the processor to receive one or more of the link quality information, the ACK/NACK, and the SR in one of the control channel or the data channel of the second slot.

10. A wireless communication device comprising:
    means for transmitting a first transmission to another wireless communication device during a first one of a plurality of slots, the wireless communication device having a parent-child relation with the other wireless communication device because the wireless communication device is not in a path of communication between the other wireless communication device and a core network;
    means for receiving from the other wireless communication device a second transmission during a second one of the plurality of slots, the second transmission including link quality information about the first transmission and scheduling a third transmission between the wireless communication device and the other wireless communication device, wherein the link quality information about the first transmission includes at least one or more combinations of beam index, or beam coherence time;
    means for receiving data, from the other wireless communication device via a sidelink formatted slot; and means for transmitting, to the other wireless communication device via the sidelink formatted slot, a physical downlink control channel (PDCCH) comprising an ACK/NACK associated with the data received from the other wireless communication device or a physical downlink shared channel (PDSCH) comprising the ACK/NACK associated with the data received from the other wireless communication device.

11. The wireless communication device of claim 10, wherein the means for transmitting further comprising means for transmitting the third transmission.

12. The wireless communication device of claim 10, wherein the means for receiving further comprising means for receiving the third transmission.

13. The wireless communication device of claim 10, wherein the means for receiving further comprises means for receiving one or more of an ACK/NACK for data transmitted during the first transmission, or a scheduling request (SR) for a subsequent communication between the wireless communication device and the other wireless communication device.

14. The wireless communication device of claim 13, wherein each of the plurality of slots includes a control channel and a data channel, and the means for receiving further comprises means for receiving one or more of the link quality information, the ACK/NACK, and the SR in one of the control channel or the data channel of the second slot.

15. A non-transitory computer readable medium including program instructions stored thereon for:
transmitting, by a first wireless communication device, a first transmission to a second wireless communication device during a first one of a plurality of slots wherein the second wireless communication device does not have a parent-child relationship with the first wireless communication device because the first wireless communication device is not in a path of communication between the second wireless communication device and a core network; and
receiving, by the first wireless communication device, a second transmission from the second wireless communication device during a second one of the plurality of slots, the second transmission including link quality information about the first transmission and scheduling a third transmission between the first and second wireless communication devices, wherein the link quality information about the first transmission includes at least one or more combinations of beam index, or beam coherence time;
receiving data, using the first wireless communication device, from the second wireless communication device via a sidelink formatted slot; and
transmitting, using the first wireless communication device, to the second wireless communication device via the sidelink formatted slot, a physical downlink control channel (PDCCH) comprising an ACK/NACK associated with the data received from the second wireless communication device or a physical downlink shared channel (PDSCH) comprising the ACK/NACK associated with the data received from the second wireless communication device.

16. The non-transitory computer readable medium of claim 15, further comprising program instructions for receiving by the first wireless communication device the third transmission from the second wireless communication device.

17. The non-transitory computer readable medium of claim 15, further comprising program instructions for transmitting by the first wireless communication device the third transmission to the second wireless communication device.

18. The non-transitory computer readable medium of claim 15, further comprising program instructions for receiving, in the second transmission, one or more of an ACK/NACK for data transmitted during the first transmission, or a scheduling request (SR) for a subsequent communication between the first and second wireless communication devices.

19. The non-transitory computer readable medium of claim 18, wherein each of the plurality of slots includes a control channel and a data channel, the non-transitory computer readable medium further comprising program instructions for receiving one or more of the link quality information, the ACK/NACK, or the SR in one of the control channel or the data channel of the second slot.

* * * * *